US012760483B2

(12) United States Patent
Zhu et al.

(10) Patent No.: US 12,760,483 B2
(45) Date of Patent: Oct. 13, 2026

(54) BIOCHAR-ENHANCED GRASS BLANKET FOR REMEDIATING CONTAMINATED SEDIMENT AND PREPARATION METHOD THEREOF, AND METHOD FOR REMEDIATING CONTAMINATED SEDIMENT

(71) Applicants: INNOVATION CENTER OF YANGTZE RIVER DELTA, ZJU, Jiaxing (CN); ZHEJIANG UNIVERSITY, Hangzhou (CN)

(72) Inventors: Liang Zhu, Jiaxing (CN); Lecheng Wei, Jiaxing (CN); Haoyu Chen, Jiaxing (CN); Binbin Jiang, Jiaxing (CN); Xiangyang Xu, Jiaxing (CN)

(73) Assignees: INNOVATION CENTER OF YANGTZE RIVER DELTA, ZJU, Jiaxing (CN); ZHEJIANG UNIVERSITY, Hangzhou (CN)

( * ) Notice: Subject to any disclaimer, the term of this patent is extended or adjusted under 35 U.S.C. 154(b) by 514 days.

(21) Appl. No.: 18/239,285

(22) Filed: Aug. 29, 2023

(65) Prior Publication Data

US 2025/0012028 A1 Jan. 9, 2025

(30) Foreign Application Priority Data

Jul. 6, 2023 (CN) ......................... 202310825654.7

(51) Int. Cl.
*C02F 3/32* (2023.01)
*E02B 3/02* (2006.01)
(Continued)

(52) U.S. Cl.
CPC ................ *E02B 3/023* (2013.01); *C02F 3/32* (2013.01); *C02F 3/327* (2013.01);
(Continued)

(58) Field of Classification Search
CPC ...... E02B 3/023; C02F 3/32; C02F 2101/363; C02F 2103/007; C02F 2209/006;
(Continued)

(56) References Cited

U.S. PATENT DOCUMENTS

2022/0232836 A1* 7/2022 Sit .......................... A01N 63/30

FOREIGN PATENT DOCUMENTS

CN 110745964 A * 2/2020 ................ C02F 3/32
CN 110915336 A * 3/2020 ............. A01K 67/33
(Continued)

OTHER PUBLICATIONS

English translation of CN_110745964A, Feb. 4, 2020. (Year: 2020).*
(Continued)

*Primary Examiner* — Joseph W Drodge

(57) ABSTRACT

Provided are a biochar-enhanced grass blanket for remediating contaminated sediment and a preparation method thereof, and a method for remediating contaminated sediment. The preparation method includes immersing a porous carrier in a starch adhesive solution and a porous biochar suspension sequentially to obtain a carrier loaded with a biochar on a surface; culturing the carrier loaded with a biochar on a surface in a culture solution inoculated with an activated sludge to obtain a surface-functionalized carrier; mixing a submerged plant seed with water, and adding the surface-functionalized carrier thereto to obtain a carrier deposited with the submerged plant seed; and subjecting the carrier deposited with the submerged plant seed to germination in a nutrient solution to obtain the biochar-enhanced grass blanket for remediating contaminated sediment.

16 Claims, 2 Drawing Sheets

(51) Int. Cl.
*C02F 101/36* (2006.01)
*C02F 103/00* (2006.01)

(52) U.S. Cl.
CPC .. *C02F 2101/363* (2013.01); *C02F 2103/007* (2013.01); *C02F 2209/006* (2013.01); *C02F 2301/046* (2013.01); *C02F 2301/063* (2013.01)

(58) Field of Classification Search
CPC .......... C02F 2301/046; C02F 2301/063; C02F 11/02; C02F 2101/16; C02F 3/327; Y02W 10/10; A01G 22/00; A01G 33/00
See application file for complete search history.

(56) References Cited

FOREIGN PATENT DOCUMENTS

| | | | | | |
|---|---|---|---|---|---|
| CN | 111333196 | A | * | 6/2020 | C02F 3/32 |
| CN | 111892175 | A | * | 11/2020 | C02F 3/34 |
| CN | 112387778 | A | * | 2/2021 | B09C 1/105 |
| CN | 112897824 | A | * | 6/2021 | C02F 9/00 |
| CN | 213719138 | U | * | 7/2021 | |
| CN | 114680021 | A | * | 7/2022 | D04H 1/4358 |
| CN | 115432824 | A | * | 12/2022 | C02F 3/32 |
| CN | 116253436 | A | * | 6/2023 | C02F 3/301 |
| WO | WO-2022199410 | A1 | * | 9/2022 | C10B 53/02 |

OTHER PUBLICATIONS

English translation of CN_110915336A, Mar. 27, 2020. (Year: 2020).*
English translation of CN_111333196A, Jun. 26, 2020. (Year: 2020).*
English translation of CN_111892175A, Jul. 19, 2022. (Year: 2022).*
English translation of CN _112387778A, Oct. 13, 2020. (Year: 2020).*
English translation of CN_112897824A, Jun. 4, 2021. (Year: 2021).*
English translation of CN_113072966A, Jul. 6, 2021. (Year: 2021).*
English translation of CN_114680021A, Jul. 1, 2022. (Year: 2022).*
English translation of CN_115432824A, Dec. 6, 2022. (Year: 2022).*
English translation of WO_2022199410A, Sep. 29, 2022. (Year: 2022).*
English machine translation of CN 116253436A, Jun. 13, 2023. (Year: 2023).*
English Machine translation of CN213719138U, Jul. 15, 2021. (Year: 2021).*

* cited by examiner

BIOCHAR-ENHANCED GRASS BLANKET FOR REMEDIATING CONTAMINATED SEDIMENT AND PREPARATION METHOD THEREOF, AND METHOD FOR REMEDIATING CONTAMINATED SEDIMENT

This patent application claims the priority of Chinese Patent Application No. 202310825654.7, entitled "Biochar-enhanced grass blanket for remediating contaminated sediment and preparation method thereof, and method for remediating contaminated sediment" filed with the China National Intellectual Property Administration on Jul. 6, 2023, the disclosure of which is incorporated herein by reference in its entirety.

TECHNICAL FIELD

The present disclosure relates to the technical field of contaminated sediment remediation, and particularly relates to a biochar-enhanced grass blanket for remediating contaminated sediment and a preparation method thereof, and a method for remediating contaminated sediment.

BACKGROUND

As an important part of the water body, the contaminated sediment is an "aggregation" of various pollutants in the water body, including nitrogen and phosphorus nutrients, heavy metals, and refractory organic matter. Due to the complex material exchange between the contaminated sediment with the upper water body at all times, when the concentration of pollutants in the upper water body decreases, a large number of pollutants in the contaminated sediment will be re-released into the upper water body through a concentration gradient effect. It is reported that from 2007 to 2016, about 128 Gg of nitrogen was released from the contaminated sediment into the water body of Taihu Lake, hindering the further improvement of the water quality of Taihu Lake. In view of this, the remediation of contaminated sediment is extremely necessary for the improvement of water quality and the water environment of the water body. Common methods for remediation of the contaminated sediment include dredging, in-situ chemical remediation and biological enhancement remediation, and in-situ covering. Among them, the in-situ covering technology is widely used to reduce the flux of pollutants released from contaminated sediment due to its advantages, such as simple operation, high cost-efficiency, energy saving, and environmental protection. The selection of the in-situ covering material is a key factor. Common covering materials include zeolite, activated carbon, and fly ash. However, they exhibit disadvantages such as low efficiency, high cost, and ecological risks in engineering practice. As the most common mean of the biological enhancement remediation, submerged plants can effectively absorb and metabolize various pollutants in the contaminated sediment, improve the sediment matrix, and reduce the release of pollutants. However, when planting the submerged plants, there is often faced with problems such as limited terrain conditions, difficult construction, and low survival rate. In summary, in view of the various shortcomings among existing remediation techniques, it is urgent to develop new materials and methods for the remediation of contaminated sediment.

Chinese patent with Publication No. CN111499134A discloses an in-situ remediation blanket for riverbed contaminated sediment and a method for remediating riverbed contaminated sediment. The remediation blanket includes a contaminated sediment remediation layer, an aquatic plant layer, and a substrate layer: the substrate layer is fixedly arranged on the contaminated sediment remediation layer, and the aquatic plant layer grows on the substrate layer; and the contaminated sediment remediation layer includes a supporting framework and a remediation agent layer wrapped outside the supporting framework. Chinese patent with Publication No. CN214218508U discloses an ecological blanket for in-situ sequestration of river-contaminated sediment and underwater ecological remediation. The ecological blanket is sequentially provided with a waterproof layer, a counterweight layer, a nutrient layer, and a planting layer from bottom to top: a conduit with one end protruding from a river surface is arranged in the waterproof layer, and a vent hole is arranged at one side of a part of the conduit located in the waterproof layer. Chinese patent with Publication No. CN113955855A discloses an ecological blanket for remediating water bodies and use thereof. The ecological blanket includes a waterproof layer, a multifunctional remediation layer, a slow-release nutrient layer, and a planting layer that are arranged sequentially from bottom to top; the waterproof layer, the multifunctional remediation layer, the slow-release nutrient layer, and the planting layer are all detachably connected; where the multifunctional remediation layer is prepared from waste bricks, limestone, and negative-magnetically modified biochar. The ideas of the above patents are all to reduce the flux of pollutants released from the contaminated sediment by setting up a contaminated sediment remediation layer-substrate layer-aquatic plant layer (from bottom to top), and at the same time, increase the survival rate of aquatic plants by setting up a substrate layer with an external source. Since the aquatic plants all grow on the exogenous substrates, they fail to play the role of improving sediment and ingesting pollutants, and the exogenous substrates also have the risk of secondary release of the pollutants.

SUMMARY

An object of the present disclosure is to provide a biochar-enhanced grass blanket for remediating contaminated sediment and a preparation method thereof, and a method for remediating contaminated sediment. The grass blanket for remediating contaminated sediment prepared by the method can not only efficiently absorb pollutants released from the contaminated sediment but also facilitate the entry of the root system of submerged plants into the contaminated sediment simultaneously, thereby improving the survival rate of the submerged plant and effectively ameliorating the matrix of the contaminated sediment.

To achieve the above object, the present disclosure provides the following technical solutions:

The present disclosure provides a method for preparing a biochar-enhanced grass blanket for remediating contaminated sediment, including:

- immersing a porous carrier in a starch adhesive solution and a porous biochar suspension sequentially to obtain a carrier loaded with a biochar on a surface;
- culturing the carrier loaded with a biochar on a surface in a culture solution inoculated with an activated sludge to obtain a surface-functionalized carrier:
- mixing a submerged plant seed with water, and adding the surface-functionalized carrier thereto to obtain a carrier deposited with the submerged plant seed; and subjecting the carrier deposited with the submerged plant seed to germination in a nutrient solution to obtain the biochar-enhanced grass blanket for remediating contaminated sediment.

In some embodiments, the porous carrier is immersed in the starch adhesive solution for 10 min to 20 min; and the porous carrier is immersed in the porous biochar suspension for 30 min to 60 min.

In some embodiments, the starch adhesive solution includes a starch adhesive and water, and a dose ratio of the starch adhesive to water is in a range of (80-150) g:1 L.

In some embodiments, the porous biochar suspension is prepared by a process including the following steps:

subjecting a biomass to pyrolysis to obtain the biochar; and mixing the biochar with water to obtain the porous biochar suspension.

In some embodiments, the pyrolysis is conducted at a temperature of 500° C. to 700° C. for 2 h to 3 h, and raising to the temperature for the pyrolysis is conducted at a heating rate of 10° C./min to 20° C./min; and a dose ratio of the biochar to water is in a range of (10-50) g:1 L.

In some embodiments, the culture solution includes the following components by concentration: 800 mg/L to 1,000 mg/L of sodium acetate, 200 mg/L to 400 mg/L of ammonium sulfate, and 40 mg/L to 50 mg/L of sodium dihydrogen phosphate:

the activated sludge is derived from a secondary sedimentation tank of a sewage treatment plant, and has an inoculum amount of 10 mL/L to 30 mL/L; and the culturing is conducted at a temperature of 25° C. to 35° C. for 2 days to 3 days.

In some embodiments, the submerged plant seed includes one or more selected from the group consisting of *Vallisneria natans*, *Hydrilla verticillata*, *Myriophyllum verticillatum*, and *Potamogeton crispus*; and a dose ratio of the submerged plant seed to water is in a range of (0.5-1.0) kg:1 L.

In some embodiments, the nutrient solution includes the following components by concentration: 10 mg/L to 20 mg/L of urea, 40 mg/L to 80 mg/L of calcium nitrate, 40 mg/L to 80 mg/L of potassium nitrate, 5 mg/L to 8 mg/L of ammonium dihydrogen phosphate, 20 mg/L to 30 mg/L of magnesium sulfate, 2 mg/L to 5 mg/L of an ethylenediaminetetraacetic acid (EDTA) sodium salt, 0.02 mg/L to 0.05 mg/L of boric acid, 0.02 mg/L to 0.05 mg/L of manganese sulfate, 0.02 mg/L to 0.05 mg/L of zinc sulfate, 0.02 mg/L to 0.05 mg/L of copper sulfate, and 0.02 mg/L to 0.05 mg/L of ammonium molybdate; and the germination is conducted at a temperature of 25° C. to 30° C. for 30 days to 50 days.

The present disclosure further provides a biochar-enhanced grass blanket for remediating contaminated sediment prepared by the method described in the above technical solutions, including a carrier and a submerged plant covered on the carrier; where the carrier includes a porous carrier, and an adhesive layer, a biochar layer, and a functional microorganism layer that are sequentially located on a surface of a pore structure of the porous carrier; and the submerged plant contained in the biochar-enhanced grass blanket for remediating contaminated sediment has a coverage density of 600 plants/m$^2$ to 900 plants/m$^2$ and a length of 30 cm to 60 cm.

The present disclosure further provides a method for remediating contaminated sediment using the biochar-enhanced grass blanket for remediating contaminated sediment described in the above technical solutions, including:

covering a surface of contaminated sediment to be remediated with the biochar-enhanced grass blanket for remediating contaminated sediment, and performing remediation.

The present disclosure provides a method for preparing a biochar-enhanced grass blanket for remediating contaminated sediment, including: immersing a porous carrier in a starch adhesive solution and a porous biochar suspension sequentially to obtain a carrier loaded with a biochar on a surface; culturing the carrier loaded with a biochar on a surface in a culture solution inoculated with an activated sludge to obtain a surface-functionalized carrier; mixing a submerged plant seed with water, and adding the surface-functionalized carrier thereto to obtain a carrier deposited with the submerged plant seed; and subjecting the carrier deposited with the submerged plant seed to germination in a nutrient solution to obtain the biochar-enhanced grass blanket for remediating contaminated sediment.

Compared with the prior art, some embodiments of the present disclosure have the following beneficial effects:

1) In the present disclosure, the ectopic culture of the porous carrier and the submerged plant is beneficial for the submerged plant to absorb pollutants through its root system while ensuring the survival rate of the submerged plant, and at the same time, helps the root system of the submerged plant to grow downward and take root in the contaminated sediment, accelerating the improvement of contaminated sediment and the reduction of pollutants.

2) The setting of the porous carrier and the loading of the biochar-functional microorganism are conducive to the material exchange between the upper water body, the covering layer, and the contaminated sediment, maintaining a higher material exchange flux, which is beneficial for the covering layer to absorb the pollutants released from the contaminated sediment and accelerate the absorption and degradation of the pollutants released from the contaminated sediment.

3) Loading porous biochar onto the surface of the porous carrier can greatly increase the surface area and the adsorption capacity of the carrier and provide sites for the attachment of functional microorganisms to accelerate the formation of a functional biofilm, improve the metabolic conversion of adsorbed pollutants, and guarantee a long-term function of the covering layer (the biochar-enhanced grass blanket for remediating contaminated sediment).

4) The starch adhesive in the starch adhesive solution can be used as a slow-release carbon source under the premise of ensuring the stable loading of biochar. The starch adhesive can provide nutrients for the growth of submerged plants on the one hand, and a carbon source for microbial denitrification on the surface of the biochar to increase the denitrification rate on the other hand.

5) The grass blanket is easy to install and maintain. The submerged grass blanket can be picked up regularly by means such as external buoys, thereby checking the survival rate of the submerged plant to facilitate the replanting and regular harvesting of the submerged plant.

The present disclosure further provides a method for remediating contaminated sediment using the biochar-enhanced grass blanket for remediating contaminated sediment described in the above technical solutions, including: covering a surface of contaminated sediment to be remediated with the biochar-enhanced grass blanket for remediating contaminated sediment, and performing remediation. The existence of the porous carrier in the grass blanket for remediating contaminated sediment is beneficial to facilitate the material exchange between the upper water body, covering layer, and contaminated sediment, adsorbs the pollutants released from the contaminated sediment on the interface of the biochar, facilitate the uptake of the pollutants by the submerged plants through their rich root system, and at the same time, helps the root system of the submerged plants to grow downward and take root in the contaminated sediment, thus accelerating the activation of contaminated sediment substrate and the reduction of the pollutants. The submerged plant can provide oxygen for the microorganisms on the surface of the biochar through photosynthesis and accelerate the aerobic conversion of the pollutants adsorbed by the covering layer. During the process of remediation, the starch as an adhesive can be used as a slow-release carbon source, which provides nutrients for the growth of submerged plants on the one hand, and a carbon source for microbial denitrification on the surface of biochar on the other hand.

DETAILED DESCRIPTION OF THE EMBODIMENTS

Figure 1:
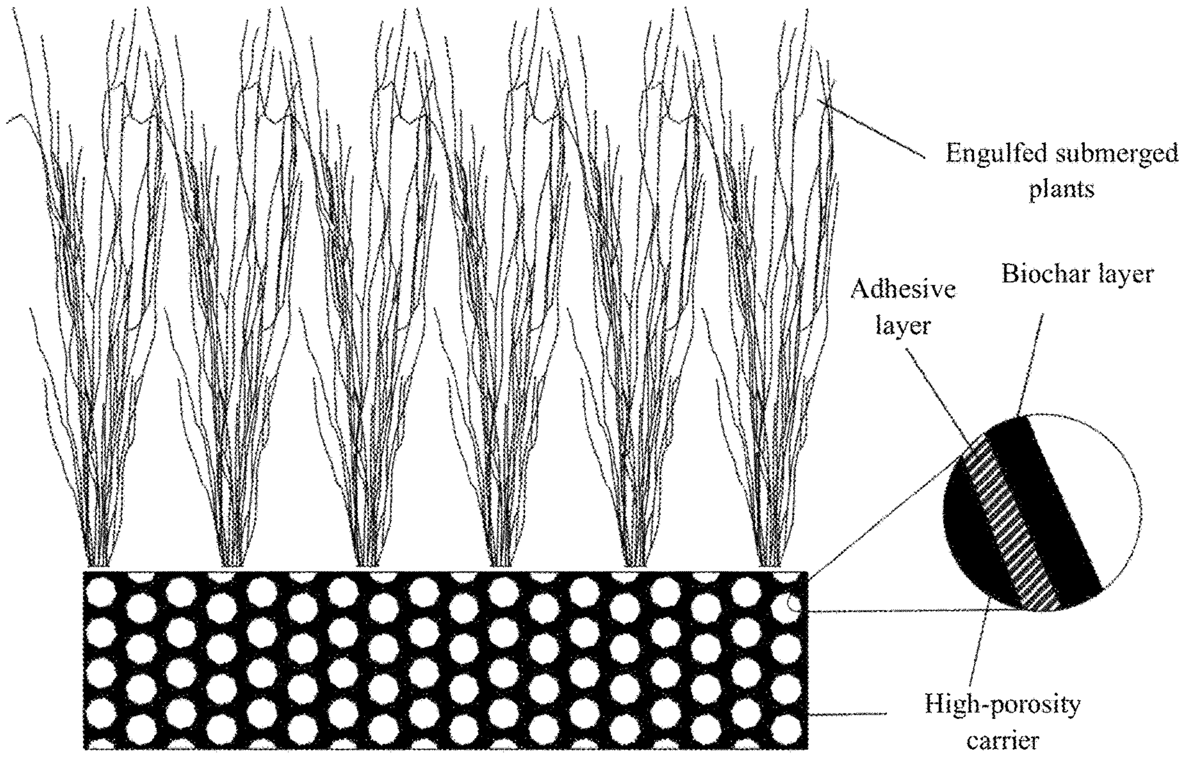
FIG. 1 shows a structural schematic diagram of the biochar-enhanced grass blanket for remediating contaminated sediment according to an embodiment of the present disclosure.

The present disclosure provides a method for preparing a biochar-enhanced grass blanket for remediating contaminated sediment, including:

- immersing a porous carrier in a starch adhesive solution and a porous biochar suspension sequentially to obtain a carrier loaded with a biochar on a surface:
- culturing the carrier loaded with a biochar on a surface in a culture solution inoculated with an activated sludge to obtain a surface-functionalized carrier:
- mixing a submerged plant seed with water, and adding the surface-functionalized carrier thereto to obtain a carrier deposited with the submerged plant seed; and
- subjecting the carrier deposited with the submerged plant seed to germination in a nutrient solution to obtain the biochar-enhanced grass blanket for remediating contaminated sediment.

In the present disclosure, unless otherwise specified, all raw materials for preparation are commercially available products well known to those skilled in the art.

In the present disclosure, a porous carrier is immersed in a starch adhesive solution and a porous biochar suspension sequentially to obtain a carrier loaded with a biochar on a surface.

In some embodiments of the present disclosure, the porous carrier has a porosity of 0.7 to 0.96, preferably 0.8 to 0.9, and more preferably 0.88. In some embodiments of the present disclosure, the porous carrier is a foamed sponge synthesized from a polyester fiber, and the foamed sponge has a vertical thickness of 10 cm to 20 cm and a PPI index of 15 to 40.

In some embodiments of the present disclosure, the starch adhesive solution includes a starch adhesive and water, and a dose ratio of the starch adhesive to water is in a range of (80-150) g:1 L, and preferably 100 g:1 L. In some embodiments of the present disclosure, the starch adhesive includes starch, cooked paste, ferric sulfate, caustic soda, and borax: a mass percentage of the starch in the starch adhesive is in a range of 70% to 80%, preferably 72% to 78%, and more preferably 74% to 76%: a mass percentage of the cooked paste in the starch adhesive is in a range of 10% to 15%, preferably 11% to 14%, and more preferably 12% to 13%; a mass percentage of the ferric sulfate in the starch adhesive is in a range of 3% to 5%, preferably 3.5% to 4.5%, and more preferably 3.8% to 4.2%: a mass percentage of the caustic soda in the starch adhesive is in a range of 2.5% to 3.5%, and preferably 2.8% to 3.2%; and a mass percentage of the borax in the starch adhesive is in a range of 2.6% to 3.5%, and preferably 2.8% to 3.2%.

In some embodiments of the present disclosure, when the porous carrier is immersed in the starch adhesive solution, the immersing is conducted at a temperature of 50° C. to 80° C., and preferably 70° C. to 77° C.; and the immersing is conducted for 10 min to 20 min, preferably 12 min to 18 min, and more preferably 14 min to 16 min.

In the present disclosure, the purpose of immersing the porous carrier in the starch adhesive solution is to use starch as an adhesive to increase the loading rate of the biochar and ensure that the biochar layer has loading stability and will not fall off in the actual water environment. Moreover, starch can be used as a slow-release carbon source to provide nutrients for functional microorganisms and electrons for the denitrification of the functional microorganisms.

In some embodiments of the present disclosure, the porous biochar suspension is prepared by a process including the following steps:

- subjecting a biomass to pyrolysis to obtain a biochar; and
- mixing the biochar with water to obtain the porous biochar suspension.

In the present disclosure, there is no special limitation on the type of the biomass, any type well known to those skilled in the art may be used. In some embodiments of the present disclosure, the biomass is a biomass waste: the biomass waste is one or more selected from the group consisting of wood chip waste, coconut shell waste, peach shell waste, and bamboo chip waste. When the biomass waste includes two or more of the above specific options, there is no special limitation on the proportion of the above specific substances, which may be mixed according to any proportion.

Before the pyrolysis, the present disclosure further comprises crushing the biomass. There is no special limitation on the process of the crushing, which is conducted by a process well known to those skilled in the art, such that the crushed biomass has a particle size of greater than or equal to 10 mesh (more preferably 30 mesh to 50 mesh).

In some embodiments of the present disclosure, the pyrolysis is conducted at a temperature of 500° C. to 700° C., preferably 550° C. to 650° C., and more preferably 580° C. to 620° C.: the pyrolysis is conducted for 2 h to 3 h, preferably 2.2 h to 2.8 h, and more preferably 2.4 h to 2.6 h: raising to the temperature for the pyrolysis is conducted at a heating rate of 10° C./min to 20° C./min, preferably 12° C./min to 18° C./min, and more preferably 14° C./min to 16° C./min. In some embodiments of the present disclosure, the pyrolysis is conducted in a nitrogen atmosphere.

In some embodiments of the present disclosure, the biochar has a porosity of greater than 0.2, preferably greater than 0.25, and more preferably greater than 0.3.

In some embodiments, after the pyrolysis is completed, the present disclosure further comprises grinding and sieving in sequence. There is no special limitation on the processes of the grinding and sieving any process well known to those skilled in the art may be used, as long as it ensures that the biochar powder obtained after the sieving has a particle size greater than or equal to 50 mesh.

After the biochar is obtained, the biochar is mixed with water to obtain the porous biochar suspension.

In some embodiments of the present disclosure, a dose ratio of the biochar to water is in a range of (10-50) g:1 L, preferably (15-45) g:1 L, and more preferably (25-40) g:1 L.

In some embodiments of the present disclosure, when the immersing is conducted in the porous biochar suspension, the immersing is conducted for 30 min to 60 min, preferably 35 min to 55 min, and more preferably 40 min to 50 min.

In some embodiments, after the immersing in the porous biochar suspension is completed, the present disclosure further comprises washing and drying in sequence: the washing is conducted 3 to 5 times with clean water: the drying is conducted by backing dry: the backing dry is conducted at 65° C.; and the backing dry is conducted for 5 h.

In the present disclosure, the purpose of immersing in the porous biochar suspension is to make the porous biochar evenly load on the surface of the carrier and functionalize the surface of the carrier to form a functional biochar layer.

After the carrier loaded with a biochar on a surface is obtained, the carrier with a biochar on a surface is cultured in a culture solution inoculated with an activated sludge to obtain a surface-functionalized carrier.

In some embodiments of the present disclosure, the specific process of the culturing is performed by: placing the carrier with a biochar on a surface in a culture solution and inoculating an activated sludge to culture.

In some embodiments of the present disclosure, the culture solution is selected from the group consisting of sodium acetate, ammonium sulfate, and sodium dihydrogen phosphate: the sodium acetate has a concentration of 800 mg/L to 1,000 mg/L, preferably 850 mg/L to 950 mg/L, and more preferably 880 mg/L to 920 mg/L: the ammonium sulfate has a concentration of 200 mg/L to 400 mg/L, preferably 250 mg/L to 350 mg/L, and more preferably 280 mg/L to 320 mg/L; and the sodium dihydrogen phosphate has a concentration of 40 mg/L to 50 mg/L, preferably 42 mg/L to 48 mg/L, and more preferably 44 mg/L to 46 mg/L.

In some embodiments of the present disclosure, the activated sludge is derived from a secondary sedimentation tank of a sewage treatment plant, and the activated sludge has an inoculum amount of 10 mL/L to 30 mL/L, preferably 15 mL/L to 25 mL/L, and more preferably 20 mL/L; the culturing is conducted at a temperature of 25° C. to 35° C., preferably 30° C. to 35° C., and more preferably 35° C.: the culturing is conducted for 2 days to 3 days, and preferably 2.5 days.

In the surface-functionalized carrier of the present disclosure, a surface of the carrier includes a starch adhesive layer, a biochar layer, and a functional microorganism layer that are arranged in sequence.

In the present disclosure, the effect of placing the carrier with a biochar on a surface into the culture solution inoculated with an activated sludge for culturing is to colonize the surface of the biochar-loaded carrier with functional microorganisms capable of conducting nitrification and denitrification.

After the surface-functionalized carrier is obtained, a submerged plant seed is mixed with water, and the surface-functionalized carrier is added to obtain a carrier deposited with the submerged plant seed.

In the present disclosure, the submerged plant seed is one or more selected from the group consisting of *Vallisneria natans*, *Hydrilla verticillata*, *Myriophyllum verticillatum*, and *Potamogeton crispus*. When the submerged plant seed includes two or more of the above specific options, there is no special limitation on the ratio of the above specific substances, which may be mixed according to any ratio.

In some embodiments of the present disclosure, a dose ratio of the submerged plant seed to water is in a range of (0.5-1.0) kg:1 L, preferably (0.6-0.8) kg:1 L, and more preferably (0.65-0.75) kg:1 L.

In some embodiments of the present disclosure, the immersing after adding the surface-functionalized carrier is conducted for 10 min to 30 min, preferably 15 min to 25 min, and more preferably 18 min to 22 min.

In some embodiments of the present disclosure, in order to ensure that the submerged plant seed is fully attached to the surface of the surface-functionalized carrier, a repeated immersing is required. There is no special limitation on the process of the repeated immersing, which may be conducted by a process well-known to those skilled in the art.

After the carrier deposited with the submerged plant seed is obtained, the carrier deposited with the submerged plant seed is subjected to germination in a nutrient solution to obtain the biochar-enhanced grass blanket for remediating contaminated sediment.

In some embodiments of the present disclosure, the nutrient solution includes urea, calcium nitrate, potassium nitrate, ammonium dihydrogen phosphate, magnesium sulfate, an EDTA sodium salt, boric acid, manganese sulfate, zinc sulfate, copper sulfate, and ammonium molybdate: the urea has a concentration of 10 mg/L to 20 mg/L, preferably 12 mg/L to 18 mg/L, and more preferably 14 mg/L to 16 mg/L: the calcium nitrate has a concentration of 40 mg/L to 80 mg/L, preferably 50 mg/L to 70 mg/L, and more preferably 55 mg/L to 65 mg/L: the potassium nitrate has a concentration of 40 mg/L to 80 mg/L, preferably 50 mg/L to 70 mg/L, and more preferably 55 mg/L to 65 mg/L: the ammonium dihydrogen phosphate has a concentration of 5 mg/L to 8 mg/L, preferably 5.5 mg/L to 7.5 mg/L, and more preferably 6 mg/L to 7 mg/L: the magnesium sulfate has a concentration of 20 mg/L to 30 mg/L, preferably 22 mg/L to 28 mg/L, and more preferably 24 mg/L to 26 mg/L: the EDTA sodium salt has a concentration of 2 mg/L to 5 mg/L, preferably 2.5 mg/L to 4.5 mg/L, and more preferably 3 mg/L to 4 mg/L: the boric acid has a concentration of 0.02 mg/L to 0.05 mg/L, and preferably 0.03 mg/L to 0.04 mg/L: the manganese sulfate has a concentration of 0.02 mg/L to 0.05 mg/L, and preferably 0.03 mg/L to 0.04 mg/L: the zinc sulfate has a concentration of 0.02 mg/L to 0.05 mg/L, and preferably 0.03 mg/L to 0.04 mg/L: the copper sulfate has a concentration of 0.02 mg/L to 0.05 mg/L, and preferably 0.03 mg/L to 0.04 mg/L; and the ammonium molybdate has a concentration of 0.02 mg/L to 0.05 mg/L, and preferably 0.03 mg/L to 0.04 mg/L.

In some embodiments of the present disclosure, the germination is conducted at a temperature of 25° C. to 30° C., preferably 26° C. to 29° C., and more preferably 27° C. to 28° C.; and the germination is conducted for 30 days to 50 days, preferably 35 days to 45 days, and more preferably 38 days to 42 days.

As shown in FIG. 1, the present disclosure further provides a biochar-enhanced grass blanket for remediating contaminated sediment prepared by the method described in the above technical solutions, including a carrier and a submerged plant covered on the carrier; where the carrier includes a porous carrier, and an adhesive layer, a biochar layer, and a functional microorganism layer that are sequentially located on a surface of a pore structure of the porous carrier; and the submerged plant contained in the grass blanket for remediating contaminated sediment has a coverage density of 600 plants/$m^2$ to 900 plants/$m^2$ and a length of 30 cm to 60 cm.

In the present disclosure, the root system of the submerged plant is located in the pore structure of the carrier, and each of the submerged plants is entangled with each other.

The present disclosure further provides a method for remediating contaminated sediment using the biochar-enhanced grass blanket for remediating contaminated sediment described in the above technical solutions, including:

covering a surface of contaminated sediment to be remediated with the biochar-enhanced grass blanket for remediating contaminated sediment, and performing remediation.

In the present disclosure, the existence of the porous carrier in the grass blanket for remediating contaminated sediment is beneficial to facilitate the material exchange between the upper water body, covering layer, and contaminated sediment, adsorb the pollutants released from the contaminated sediment on the interface of the biochar, facilitate the uptake of the pollutants by the submerged plants through their rich root system, and at the same time, helps the root system of the submerged plants to grow downward and take root in the contaminated sediment, thus accelerating the activation of contaminated sediment substrate and the reduction of the pollutants. The submerged plants can provide oxygen for the microorganisms on the surface of the biochar through photosynthesis, and accelerate the aerobic conversion of the pollutants adsorbed by the covering layer. During the process of remediation, the starch as an adhesive can be used as a slow-release carbon source, which provides nutrients for the growth of submerged plants on the one hand, and a carbon source for microbial denitrification on the surface of biochar on the other hand.

The biochar-enhanced grass blanket for remediating contaminated sediment and the preparation method thereof, and the method for remediating contaminated sediment provided by the present disclosure will be described in detail below with reference to examples, which could not be understood as limiting the scope of the present disclosure.

Example 1

A method for preparing a grass blanket for remediating contaminated sediment was performed by the following steps:

A crushed coconut shell biomass waste with a particle size of 5 mesh to 10 mesh was pyrolyzed at 600° C. for 2 h (at a heating rate of 10° C./min), ground, and passed through a 50-mesh sieve, obtaining a biochar (with a specific surface area of 540 $m^2$/g). The biochar was mixed with water, obtaining a biochar suspension (with a solid-to-liquid ratio of 40 g/L).

100.0 g of a starch adhesive (consisting of 75.6% of starch, 13.8% of cooked paste, 4.4% of ferric sulfate, 3.5% of caustic soda, and 2.7% of borax by mass percentage) and 1.0 L of water were mixed, obtaining a starch adhesive solution.

A porous carrier with a thickness of 15.1 cm and a coverage area of 1.0 $m^2$ (a foamed sponge synthesized from polyester fiber with a porosity of 0.87 and a PPI index of 35) was immersed in the starch adhesive solution for 20 min, placed in the biochar suspension (with a solid-to-liquid ratio of 40 g/L) for 60 min, washed 5 times in clean water, and dried at 60° C. for 5 h, obtaining a carrier loaded with a biochar.

The carrier loaded with a biochar was immersed in a culture solution (consisting of sodium acetate at a concentration of 1,000 mg/L, ammonium sulfate at a concentration of 200 mg/L, and sodium dihydrogen phosphate at a concentration of 40 mg/L), inoculated with an activated sludge from a secondary sedimentation tank of a sewage treatment plant in Hangzhou (with an inoculum amount of 25 mL/L), and then cultured for 3 days, obtaining a surface-functionalized carrier.

According to a solid-to-liquid ratio of 1.0 kg/L, a *Vallisneria natans* seed was mixed with water, and a surface-functionalized carrier was added thereto for immersion, and repeated immersion 3 times, and cultured in a nutrient solution (including 20 mg/L of urea, 70 mg/L of calcium nitrate, 60 mg/L of potassium nitrate, 8 mg/L of ammonium dihydrogen phosphate, 30 mg/L of magnesium sulfate, 5 mg/L of an ethylene diamine tetraacetic acid (EDTA) sodium salt, and 0.05 mg/L each of boric acid, manganese sulfate, zinc sulfate, copper sulfate, and ammonium molybdate) for 45 days (at 25° C.), obtaining the grass blanket for remediating contaminated sediment, with a *Vallisneria natans* coverage density of 730 plants/$m^2$ and a length of 35 cm to 45 cm.

0 cm to 30 cm of sediment and an upper water body in a certain place of Taihu Lake in Huzhou City were collected for laboratory in situ covering experiments. The average chemical oxygen demand (COD), total nitrogen, ammonia nitrogen, and total phosphorus concentrations in the upper water body were 17.3 mg/L, 3.67 mg/L, 1.88 mg/L, and 0.47 mg/L, respectively. According to the assessment requirements of the "Surface Water Environmental Quality Standard" (GB3838-2022), the water body belonged to an inferior V-type water body. The sediment's total organic carbon (TOC), TN, and total phosphorus (TP) contents were 45.74 mg/g, 43.40 mg/g, and 2.38 mg/g, respectively, exceeding the statistical values of nitrogen and phosphorus contents (0.225 mg/g to 1.944 mg/g) in the typical eastern lakes. The water body showed great potential for pollution release, which seriously affected the improvement of water quality and the further amelioration of the water environment. The grass blanket for remediating contaminated sediment was used as a covering material for the laboratory. The experiment was conducted under natural light at room temperature with a stirring paddle to simulate normal cement disturbance at 30 r/min for 90 d.

Figure 2:
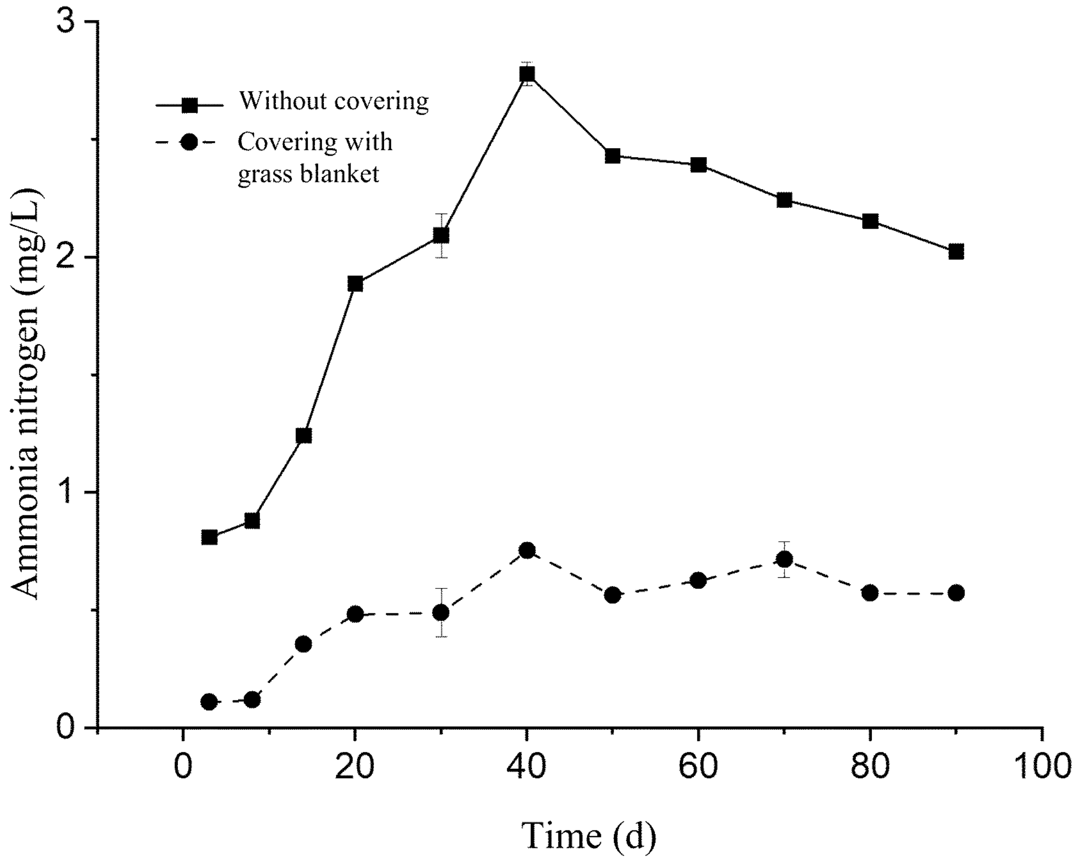
FIG. 2 shows the total nitrogen (TN) and ammonia nitrogen contents of the experimental group and the control group at different remediation times.

A scheme without covering the grass blanket for remediating contaminated sediment was as a control group, and the above scheme with covering the grass blanket for remediating contaminated sediment was as an experimental group. FIG. 2 shows the TN and ammonia nitrogen contents of the experimental group and the control group at different remediation times. As shown in FIG. 2, compared with the control group, the TN content of the upper water body of the experimental group is decreased by 61.39%, the concentration of the TN remains below 2.0 mg/L, the concentration of ammonia nitrogen remains at 0.8 mg/L, the pollution flux content is reduced by more than 57% and reduced to 20.5 mg/$m^2$ d, and the concentration of ammonia nitrogen stably meets the requirements of surface V-type water in GB3838-2002, indicating that the biochar-enhanced grass blanket for remediating contaminated sediment provided by the present disclosure has a desirable contaminated sediment remediation capacity, could significantly improve the water quality of the upper water body, and reduce the pollution flux released from the contaminated sediment.

It can be seen that the grass blanket of the present disclosure can solve the problems such as the difficult construction of biochar covering, the low survival rate of submerged plants and the difficult construction in the remediation of contaminated sediment. Moreover, the grass blanket can effectively utilize the root system of submerged plants to improve the sediment substrate while reducing the pollution load released from the contaminated sediment, and accelerating the amelioration of the habitat of the contaminated sediment and the improvement of the water quality of the upper water body.

The above descriptions are merely preferred embodiments of the present disclosure. It should be noted by those skilled in the art that without deviating from the principle of the present disclosure, various improvements or modifications can be made, and these improvements or modifications should also be regarded as the scope of the present disclosure.

What is claimed is:

1. A method for preparing a biochar-enhanced grass blanket for remediating contaminated sediment, comprising:
- immersing a porous carrier in a starch adhesive solution and a porous biochar suspension sequentially to obtain a carrier loaded with a biochar on a surface;
- culturing the carrier loaded with a biochar on a surface in a culture solution inoculated with an activated sludge to obtain a surface-functionalized carrier;
- mixing a submerged plant seed with water, and adding the surface-functionalized carrier thereto to obtain a carrier deposited with the submerged plant seed; and
- subjecting the carrier deposited with the submerged plant seed to germination in a nutrient solution to obtain the biochar-enhanced grass blanket for remediating contaminated sediment;
- wherein
- the nutrient solution comprises the following components by concentration: 10 mg/L to 20 mg/L of urea, 40 mg/L to 80 mg/L of calcium nitrate, 40 mg/L to 80 mg/L of potassium nitrate, 5 mg/L to 8 mg/L of ammonium dihydrogen phosphate, 20 mg/L to 30 mg/L of magnesium sulfate, 2 mg/L to 5 mg/L of an ethylenediaminetetraacetic acid (EDTA) sodium salt, 0.01 mg/L to 0.05 mg/L of boric acid, 0.02 mg/L to 0.05 mg/L of manganese sulfate, 0.02 mg/L to 0.05 mg/L of zinc sulfate, 0.02 mg/L to 0.05 mg/L of copper sulfate, and 0.02 mg/L to 0.05 mg/L of ammonium molybdate; and
- the germination is conducted at a temperature of 25° C. to 30° C. for 30 days to 50 days.

2. The method of claim 1, wherein the porous carrier is immersed in the starch adhesive solution for 10 min to 20 min; and
- the porous carrier is immersed in the porous biochar suspension for 30 min to 60 min.

3. The method of claim 2, wherein the starch adhesive solution comprises a starch adhesive and water, and a dose ratio of the starch adhesive to water is in a range of 80-150 grams per 1 L.

4. The method of claim 1, wherein the starch adhesive solution comprises a starch adhesive and water, and a dose ratio of the starch adhesive to water is in a range of 80-150 grams per 1 L.

5. The method of claim 1, wherein the porous biochar suspension is prepared by a process comprising the following steps:
- subjecting a biomass to pyrolysis to obtain the biochar; and
- mixing the biochar with water to obtain the porous biochar suspension.

6. The method of claim 5, wherein the pyrolysis is conducted at a temperature of 500° C. to 700° C. for 2 h to 3 h, and raising to the temperature for the pyrolysis is conducted at a heating rate of 10° C./min to 20° C./min; and
- a dose ratio of the biochar to water is in a range of 10-50 grams per 1 L.

7. The method of claim 1, wherein the culture solution comprises the following components by concentration: 800 mg/L to 1,000 mg/L of sodium acetate, 200 mg/L to 400 mg/L of ammonium sulfate, and 40 mg/L to 50 mg/L of sodium dihydrogen phosphate;
- the activated sludge is derived from a secondary sedimentation tank of a sewage treatment plant, and has an inoculum amount of 10 mL/L to 30 mL/L; and
- the culturing is conducted at a temperature of 25° C. to 35° C. for 2 days to 3 days.

8. The method of claim 1, wherein the submerged plant seed comprises one or more selected from the group consisting of *Vallisneria natans*, *Hydrilla verticillata*, *Myriophyllum verticillatum*, and *Potamogeton crispus*; and
- a dose ratio of the submerged plant seed to water is in a range of 0.5-1.0 kg per 1 L.

9. A biochar-enhanced grass blanket for remediating contaminated sediment prepared by the method of claim 1, comprising the carrier and a submerged plant covered on the carrier; wherein
- the carrier comprises the porous carrier, and an adhesive layer, a biochar layer, and a functional microorganism layer that are sequentially located on a surface of a pore structure of the porous carrier;
- the submerged plant contained in the biochar-enhanced grass blanket for remediating contaminated sediment has a coverage density of 600 plants/$m^2$ to 900 plants/$m^2$ and a length of 30 cm to 60 cm; and
- the submerged plant is obtained through germination of a submerged plant seed subjected to the nutrient solution of claim 1.

10. A method for remediating contaminated sediment using the biochar-enhanced grass blanket for remediating contaminated sediment of claim 9, comprising:
- covering a surface of contaminated sediment to be remediated with the biochar-enhanced grass blanket for remediating contaminated sediment, and performing remediation.

11. The biochar-enhanced grass blanket for remediating contaminated sediment of claim 9, wherein the porous carrier is obtained by being immersed in the starch adhesive solution for 10 min to 20 min and
- by being immersed in the porous biochar suspension for 30 min to 60 min.

12. The biochar-enhanced grass blanket for remediating contaminated sediment of claim 9, wherein the adhesive layer is obtained by utilizing a starch adhesive solution comprising a starch adhesive and water, and a dose ratio of the starch adhesive to water in a range of 80-150 grams per 1 L.

13. The biochar-enhanced grass blanket for remediating contaminated sediment of claim 9, wherein the porous biochar suspension is prepared by a process comprising the following steps:
- subjecting a biomass to pyrolysis to obtain the biochar; and
- mixing the biochar with water to obtain the porous biochar suspension.

14. The biochar-enhanced grass blanket for remediating contaminated sediment of claim 13, wherein the pyrolysis is conducted at a temperature of 500° C. to 700° C. for 2 h to 3 h, and raising to the temperature for the pyrolysis is conducted at a heating rate of 10° C./min to 20° C./min; and a dose ratio of the biochar to water is in a range of 10-50 grams per 1 L.

15. The biochar-enhanced grass blanket for remediating contaminated sediment of claim 9, wherein the submerged seed is cultured by a culture solution comprising the following components by concentration: 800 mg/L to 1,000 mg/L of sodium acetate, 200 mg/L to 400 mg/L of ammonium sulfate, and 40 mg/L to 50 mg/L of sodium dihydrogen phosphate; and by the cultured solution being inoculated with an activated sludge derived from a secondary sedimentation tank of a sewage treatment plant, and having an inoculum amount of 10 mL/L to 30 mL/L; and wherein the culturing is conducted at a temperature of 25° C. to 35° C. for 2 days to 3 days.

16. The biochar-enhanced grass blanket for remediating contaminated sediment of claim 9, wherein the submerged plant seed comprises one or more selected from the group consisting of *Vallisneria natans*, *Hydrilla verticillata*, *Myriophyllum verticillatum*, and *Potamogeton crispus*; and a dose ratio of the submerged plant seed to water is in a range of 0.5-1.0 kg per 1 L.

* * * * *